United States Patent

Fischer et al.

[15] 3,674,924

[45] July 4, 1972

[54] DOCUMENT SCANNING AND DISPLAY SYSTEM

[72] Inventors: Robert E. Fischer, Dayton; Lawrence C. Raiff, Kettering; James M. Seybold, Trotwood; Donald F. Zimmerle, Dayton, all of Ohio

[73] Assignee: The National Cash Register Company, Dayton, Ohio

[22] Filed: Oct. 2, 1970

[21] Appl. No.: 77,640

[52] U.S. Cl. ....................178/6.8, 178/DIG. 1

[51] Int. Cl. ....................H04n 7/18

[58] Field of Search....................178/DIG. 1, 6.8, 7.2

[56] References Cited

UNITED STATES PATENTS

| | | | |
|---|---|---|---|
| 3,577,153 | 5/1971 | Yagi et al. | 178/6.8 X |
| 3,445,590 | 5/1969 | Dischert et al. | 178/7.2 E |
| 2,784,246 | 3/1957 | Hurford | 178/DIG. 6 |
| 2,996,946 | 8/1961 | Brendholdt | 178/7.2 X |
| 3,467,773 | 9/1969 | Heckman, Jr. | 178/6.8 X |
| 3,544,712 | 12/1970 | Adams et al. | 178/6.8 |

*Primary Examiner*—Robert L. Griffin
*Assistant Examiner*—Richard K. Eckert, Jr.
*Attorney*—Louis A. Kline and Albert L. Sessler, Jr.

[57] ABSTRACT

A system for scanning a moving document and displaying a still image of the document without physically impeding the travel of the moving document. The documents, which may contain human-readable information thereon, are caused to be successively transported past a television camera positioned in a darkened chamber, with the document side containing the readable information oriented towards the television camera. Timed control pulses cause flash lamps, also housed in the darkened chamber, to be momentarily energized, thus bathing the document in a bright flash of light at a time when the document is positioned within the television camera's field of view. The light image formed by the document is stored in the form of charged picture elements on the television camera's light-sensitive screen. These charged picture elements are then electronically scanned for generating video signals, which are stored in a storage device. The stored video signals are subsequently displayed on one of a plurality of television display monitors on a first-in, first-out basis. The readable information is then read by human operators who determine the final disposition of the documents whose image is being currently displayed on a television monitor.

3 Claims, 4 Drawing Figures

FIG. I

INVENTORS
ROBERT E. FISCHER
LAWRENCE C. RAIFF
JAMES M. SEYBOLD &
DONALD F. ZIMMERLE
BY Louis A Kline
Albert L Sessler Jr.
THEIR ATTORNEYS INVENTORS
ROBERT E. FISCHER
LAWRENCE C. RAIFF
JAMES M. SEYBOLD &
DONALD F. ZIMMERLE BY Louis A Kline
Albert L Sessler Jr

THEIR ATTORNEYS

INVENTORS
ROBERT E. FISCHER
LAWRENCE C. RAIFF
JAMES M. SEYBOLD &
DONALD F. ZIMMERLE
BY Louis A Kline
Albert L Jeffers
THEIR ATTORNEYS INVENTORS
ROBERT E. FISCHER
LAWRENCE C. RAIFF
JAMES M. SEYBOLD &
DONALD F. ZIMMERLE Louis A Kline BY Albert L Sessler

THEIR ATTORNEYS

DOCUMENT SCANNING AND DISPLAY SYSTEM

BACKGROUND OF THE INVENTION

This invention relates to apparatus for electronically arresting the motion of moving documents and causing a display of them without actually halting the travel of the moving documents.

A basic component in the letter sorting process, as performed in major facilities of the United States Post Office Department, is a letter sorting machine, commonly referred to as the LSM. The LSM, which may contain more than two hundred sorting destinations, is supplied with letters by up to 12 inserter console stations, each manned by an operator. The letters are presented to the operator at a rate of about one per second and are held motionless in a reading position for about 0.6 of a second. The task of the operator is to read the essential address information and to enter it, via a standard keyboard, into a memory system which ultimately directs the letter to a particular destination in the LSM. The operator is paced by the keyboard; therefore, failure to read a letter in the allotted time results in a rejected letter. Working in a noisy, distracting, and perhaps physically uncomfortable environment under machine-paced conditions is conducive to early fatigue, low efficiency, and high error rate. Furthermore, the physical separation of the loading positions of the twelve inserter console stations entails a mail supply operation of low efficiency.

The prior art is replete with systems which present articles or documents for viewing by an operator who reads the address information for encoding or processing the document or directing it to a final destination. HOwever, one drawback found in the prior art is the fact that the travel of the document must be halted or considerably reduced in order that the operator may read the information. This necessarily results in a slow and therefore expensive operation. U.S. Pat. No. 2,677,473, issued May 4, 1954, on the application of John Piggott et al., U.S. Pat. No. 3,071,261, issued Jan. 1, 1963, on the application of William Fischer, and U.S. Pat. No. 3,368,701, issued Feb. 13, 1968, on the application of Geoffrey Percy Copping et al., are representative of the prior art. Identification systems employing video techniques are also described in Volume 19, No. 1, Feb. 1970, of the IEEE Transactions.

The instant invention provides a means whereby an operator can read identifying information of a moving document on a television monitor without inhibiting the travel of the moving document. The operator need not be positioned near the moving document, as the television monitors may be placed in locations remote from the moving documents, thus enabling the operators to work in more comfortable quarters, which also enhances their acuity and occular comfort. The present invention also enables the operator to read at his own speed rather than at the speed of the moving documents.

SUMMARY OF THE INVENTION

Documents, articles, letters, or the like, bearing printed or handwritten alphanumeric information are picked up by a suction device which transfers them to a vacuum take-away belt which accelerates the letters to a high velocity. The documents are then transferred to a twist belt section, which effects straightening and leveling actions on the documents, so that the bottom edges are skewed not more than one degree. The documents are then caused to successively pass through a darkened chamber which contains a television camera having a photosensitive screen and an inoperative light source; e.g., flash lamps. At a particular point in time, determined by the speed at which the documents are picked up, the documents pass through the television camera's field of view, at which time control signals render the light source momentarily operative, which bathes the document in illumination of high intensity. This results in the storage of a charged image of the document on the light-sensitive screen of the television camera. The screen is scanned in a manner essentially similar to that used in conventional television practice. Video signals generated by the camera scanning means are analyzed for information content. When information (e.g., addresses) is detected, the video signals containing such information are stored on a disk recorder and subsequently routed to a display monitor for reproduction of the image, where an operator reads the address information and takes appropriate action (e.g., depressing keys on a keyboard), which programs the final disposition of the document. The disk recorder is capable of storing a plurality of images. The stored images are moved out in a first-in, first-out basis to the display monitors by the activation of the keyboard.

Because the document whose image is being captured remains illuminated for a very brief period of time, it necessarily results in the storage of a no-smear image on the light-sensitive photo-cathode tube.

One object of the present invention is to provide a flicker-free electronically-produced image.

Another object is to reduce eye fatigue encountered by operators attempting to read information on moving articles.

DESCRIPTION OF THE PREFERRED EMBODIMENT

The present invention is of the type in which a serial train of documents is caused to pass successively before a television camera which captures a still image, in the form of stored electronic charges, of the moving document. A storage device accepts a portion of the still image in the form of video frequency-modulated carrier signals for temporary storage until commanded to transmit the images to a display monitor (e.g., television screens), where the images are read for information content which determines the ultimate disposition of the document represented by the displayed image.

Figure 1:
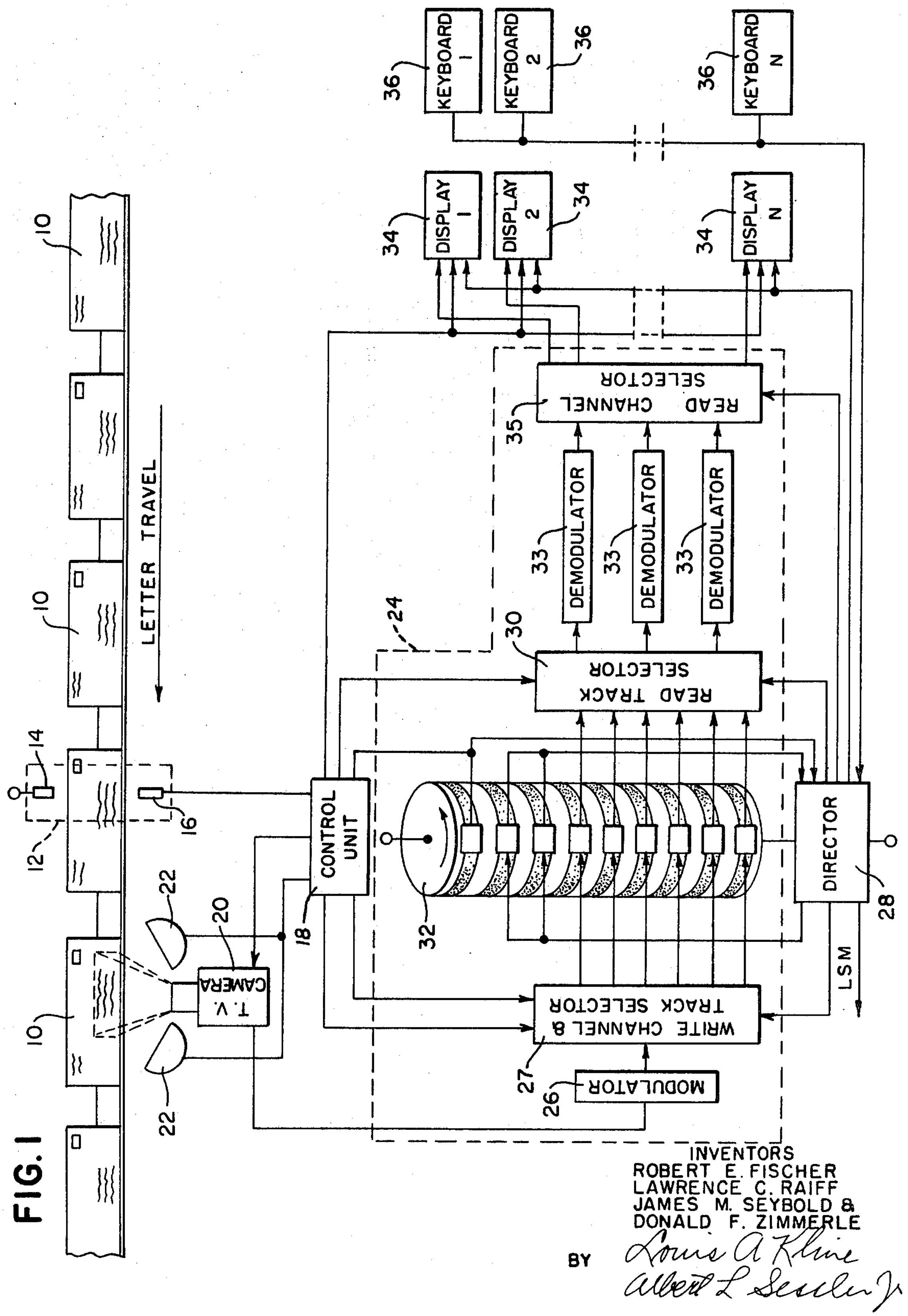
FIG. 1 is a block diagram of an embodiment of the present invention.

In order to obtain a better understanding of the present invention, reference is now made to FIG. 1, which schematically illustrates a document scanning and display system. The system includes a source of moving documents (e.g., letters) 10, which are to be scanned, displayed, and disposed of. The system includes a trailing edge detector 12, which may comprise a conventional light source 14 and a phototransistor 16. The trailing edge detector 12 transmits a signal to a control unit 18 each time that the trailing edge of a letter 10 is detected. A television camera 20 is shown as being positioned downstream of the trailing edge detector 12. The television camera 20 is located in a darkened chamber, as is a light source, which may comprise a plurality of flash lamps 22. The control unit 18 transmits an energizing pulse to the flash lamps 22 at a predetermined interval of time measured from the time that the trailing edge detector 12 has detected the trailing edge of a letter 10. The interval of time is such that, at the moment the flash lamps 22 are illuminated, a portion of the letter 10 (i.e., the portion normally containing address information) is positioned in the field of view of the television camera 20.

The television camera 20 utilized in the embodiment of FIG. 1 is a modified conventional television camera which includes a vidicon tube. The vidicon tube is used because of its characteristic photosensitive screen; however, vidicon tubes are unable in normal usage to successfully capture objects in rapid motion. This is because the charged image that is formed on the photosensitive screen of the vidicon tube is a time integral function of the light values of the object. The normal high sensitivity of a vidicon tube is due to the accumulation of charge on each picture element during the entire time that a scene or an object is being scanned. The accumulated charges are scanned by an electron scanning beam which generates a video signal in response to the charge or lack of charge on the photosensitive screen. However, if some parts of the televised scene were to move appreciably during the time of one picture-scan (or one field), the charge distribution becomes smeared in the same manner that the image on a photographic camera is smeared if the object were to move appreciably during the time that the camera shutter is open. Because the time interval during which a moving object is illuminated is so short in the present system, the travel that the object may experience during the illumination time is negligible to the extent that the object appears to be stationary as far as the camera is concerned.

However, the light must have a total integrated value (Lambert-seconds) which is somewhat greater than the value represented by continuous illumination of the scene during one frame time. This is necessary because of the tendency of the charges to leak from the photosensitive screen when the electron scanning beam is inactive.

Scanning of the charged image is accomplished by scanning the charged picture elements with the camera's electronic scanning beam, as is done in commercial television, except that in the instant embodiment the line scan is vertical and progresses upwardly (commonly referred to as the Y scan), while the field scan is horizontal and progresses from right to left (commonly referred to as the X scan). The vidicon tube electronic scanning beam is blanked out in a normal manner during the X and Y sweep retrace times. As is done in conventional television practice, two scans (i.e., two interlaced fields) are required for one complete picture. However, a problem develops when an interlaced scan is used with a vidicon tube operated in the flash exposure mode. The stored image is scanned twice, with the second set of scan lines following midway between the scan lines of the first field. (It should be recalled that two fields are interlaced to make a "-frame," or complete picture.) It is a characteristic of vidicon tubes that the electron beam affects an area considerably wider than the effective width of the scanning line. That is, the area of the vidicon sensitive screen contiguous to the scanning line is discharged to some extent as the beam scans past. In normal television practice, this is not of serious consequence, since the charge is being continually refreshed by optical input. In this application, however, this is not the case; the signal is considerably weaker during the second field period. Specifically, it has been observed that the "white " signals may be down 20 percent to 50 percent of what they would be in the first field. The result of such a variation is an objectionable change in the brightness of the displayed picture, which causes an unpleasant physiological effect on the viewer commonly known as "flicker." This effect is reduced sufficiently by a combination of the following three methods:

1. By separately optimizing the beam current for the first and second fields; i.e., specifically operating with a low beam current during the first field to reduce extraneous discharge of second field areas and increasing the beam current during the second field to obtain optimum brightness, recognizing that a departure from optimum electron beam focus may result. A compromise may be required for total optimization in regard to both flicker and picture resolution.

2. By shifting (upward) the average D. C. voltage level of the second field to equalize the brightness of the two fields.

3. By increasing the signal gain during the second field.

The scanning of the charged picture elements results in the generation of video signals which are applied generally to a video recorder system 24 and, in particular, to a modulating unit 26, which frequency-modulates a carrier frequency with the video information prior to its being stored. The recorder system 24 also includes a rotating disk storage medium 32, although other storage media may also be utilized. The frequency-modulated carrier signal is then applied to a write channel and track selector unit 27, which consists basically of electronic logic-controlled switching circuits. It is noted here that, because of the type of recorder system used and the type of scanning system which is employed, it is necessary to utilize two tracks (e.g., track A and track B of the disk storage medium 32) for one complete image, two tracks composing one channel. The video signals are switched selectively to conventional magnetic write heads, composing a part of the recorder system 24, which are held in a proper relationship with respect to the disk storage medium 32. The particular channel selected is determined by a director 28, which functions to cause the recording of information on the medium 32 in an orderly manner in the channels. The director 28 also directs the output of recorded video signals from the video recorder system 24 to selected display monitors 34 for display purposes. The outgoing signals from the recorder 24 are processed by a read track selector 30, which comprises conventional electronic logic-controlled switching circuits. A plurality of outputs, one corresponding to each channel, emanating from the read track selector 30, are applied to a corresponding demodulating unit 33 prior to being transmitted to a selected display monitor 34 via a read channel selector 35. An operator positioned at one of the selected display monitors 34 completes his function by the operation of a standard keyboard 36, which programs the displayed letter to its final destination. The keyboard 36 also simultaneously transmits a logic signal to the director 28, thus providing the director 28 with an indication that a display monitor 34 is available to receive another display. The director 28, in response to the logic signal, switches the earliest recorded information stored in the recorder 24, and not yet displayed, out to an available display monitor 34.

Figure 2:
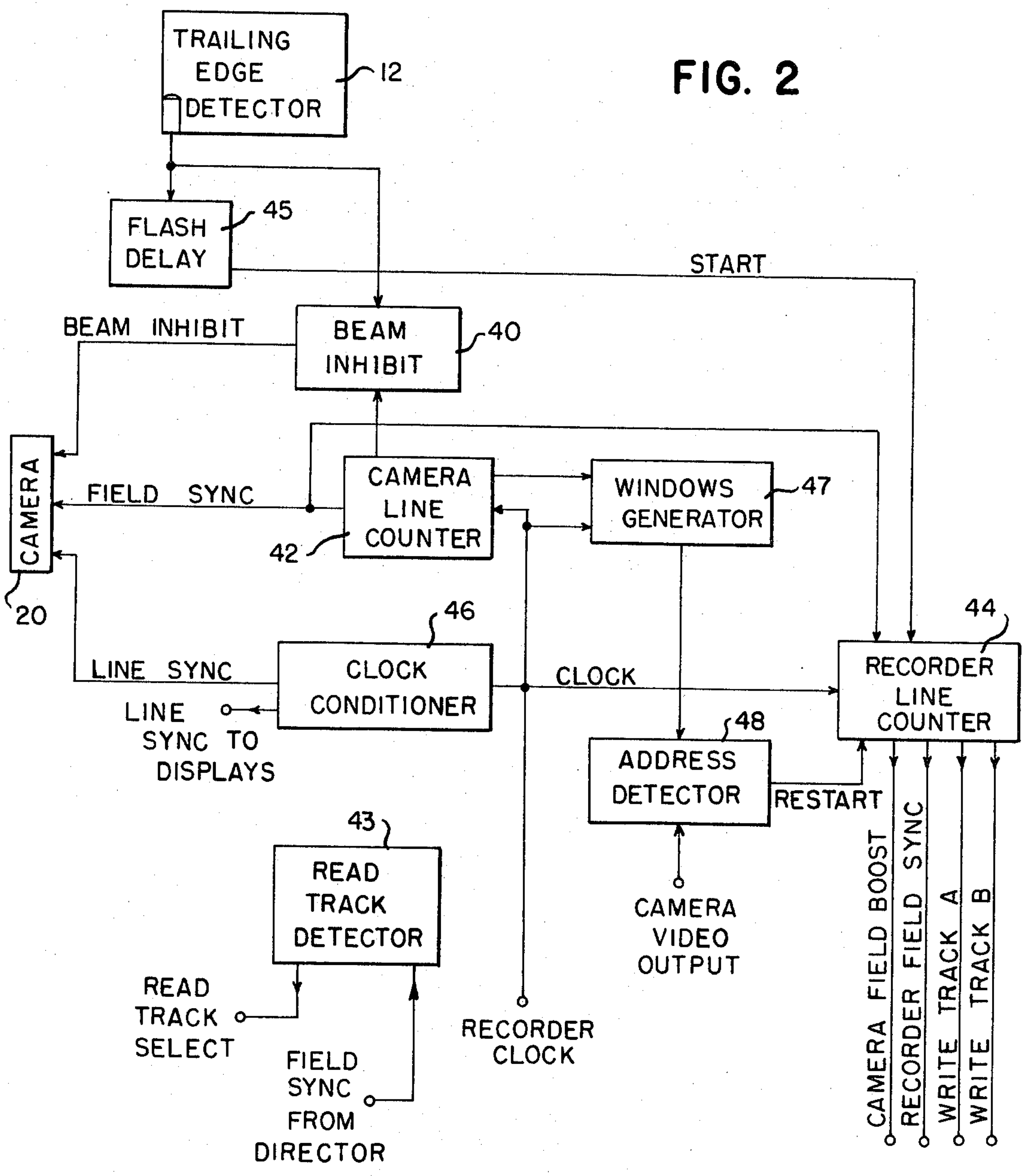
FIG. 2 is a block diagram of the control unit shown in FIG. 1.

Reference is now made to FIG. 2, which is a block diagram of the control unit 18.

The first event initiated by the trailing edge detector 12 is the transmission of a control signal to a beam inhibit 40 for inhibiting of the camera electron scanning beam by conventionally increasing the vidicon tube beam control grid voltage to a predetermined value. The beam is inhibited by the beam inhibit 40 upon completion of the first camera field scanned following the trailing edge detector 12 signal, because the letter transport system and the television camera 20 electronics are not synchronized.

The triggering of the flash lamps 22 is delayed, one camera field scanning time after the trailing edge detector has been initiated, by a flash delay 45, which may be a conventional delay circuit, in order to insure that the scanning beam is off during the flash. Readout of the video signals generated by scanning the captured image on the television camera's light-sensitive screen is initiated at the beginning of the first complete field following the triggering of the flash lamps 22. During readout of the second field, as was discussed earlier, the video gain and the camera beam intensity are increased over that set for the readout of the first field. These parameter changes are necessary in order to minimize the first-to-second-field signal variations which are caused by weakening of the captured charged image during the scanning of the first field.

The recording disc storage medium 32 rotates exactly one revolution per display field scan period and two revolutions per camera field scan. A requisite to obtain interlaced fields in the display monitors is that there be an odd number of half scan lines per field scan. A recorder clock signal is permanently recorded on the disc storage medium 32. The clock signals are the source of line scan synchronization pulses for the display monitors 34. An odd number of pulses — 1,073 in this instance — is contained in the recorder clock signal per one revolution of the disk. Alternate clock pulses provide the line synchronization signals for the display monitors 34. The disk rotates at a speed of sixty revolutions per second, yielding a recorder clock frequency of 32,190 Hz.

The recorder clock frequency is halved by a clock conditioner 46, which is a conventional binary frequency divider, to provide line synchronization pulses to the display monitors 34 and the camera 20. Using digital gating techniques, a one-half-line phase shift is inserted into the camera line synchronization signal at the beginning of the field retrace interval. This is accomplished by the clock conditioner 46. The half-line phase jump is required for proper interlace of the two camera fields. That is, since two disk revolutions occur during a camera field, the field will contain an even number of half-lines. The half-line phase jump effects the same field interlace condition as if there were an odd number of half scan lines per camera field.

A window generator 47 generates gating signals for an address detector 48. The windows generator 47 determines which portion of the video signals are to be searched for address information. The generated signals define the envelope area (windows) during which the decisions of the address detector 48 are made. The windows generator 47 comprises, in this instance, two series of monostable multivibrators for the generation of two different sets of pulses. One set of the generated pulses gate the video X scan line for the examination of information content in the X direction, and the other set gates the video Y scan line for the examination of information content in the Y direction.

The address detector 48 controls the resetting of a recorder line counter 44 during readout of the first camera field of a given letter. Resetting of the recorder line counter 44 establishes the beginning of the stored video frame, thus determining the start of the smaller picture area to be recorded and subsequently displayed. This smaller area is a portion of the larger area captured by the camera 20. The address detector 48 compares the amplitude of the camera video output signal to a reference voltage. This comparison is performed only during the window determining pulse times as developed by the windows generator 47. The first time that the video signal exceeds the reference voltage during the window periods, a recorder line counter restart signal is generated. If a restart signal is not obtained by the end of the Y scan window, then it will be generated at that time. The address detector 48 consists of a signal comparator amplifier and associated digital gating logic.

The recorder line counter 44 functions only during the time that the two fields of a captured image are scanned. The recorder line counter 44 is inhibited from counting until the beginning of the first field of camera video generated from a captured letter image. At this time, a write track A select pulse is begun, causing the camera output to be recorded on track A of a selected disc channel. The recorder line counter state continues to advance with the exception that it is recycled to a zero state by the restart pulse generated by the address detector 47. One disk revolution after the restart pulse, the write track A pulse is terminated. The video signal recorded on track A during this revolution will be one field of the picture frame presented by a selected one of the display monitors 34 at a subsequent time. A few line times prior to the end of the write track A pulse, a field sync pulse is generated. This signal is used by the director 28 to determine the field sync word to be recorded in a sector memory (to be explained later). The field sync pulse occurs at the beginning of a camera line scan. This relationship is used at a later time to select a read track to insure proper phasing between the monitor line synchronization signals and the video signal transmitted to a display monitor.

Exactly one disk revolution after the termination of the write track A pulse, the write track B pulse begins. During this pulse time, the camera video output is recorded on track B. Also during this time, the field boost pulse supplied to the camera 20 occurs. The recorder line counter 44, in conjunction with the address detector 48, thus functions so as to record a portion of the 15-frame-per-second video output of the camera, so that the recorded video signals can subsequently be used to continuously refresh a cathode ray tube display monitor at a thirty-frame-per-second frame rate, whereas the two fields composing the frame are interlaced.

The recorder line counter 44 is a conventional frequency divider with a plurality of outputs and associated logic circuitry, for providing camera field boost timing signals, recorder field sync pulse, and write track select signals. Since the recorder clock signal also drives the camera 20 electron beam scan during the record operation, any drifts in the recorder's rotational speed simultaneously affect both the video and the line sync time base, thus providing continual tracking between the two signals. This commonality of line synchronization signal originating from the rotating disk storage medium 32 eliminates the need for servo control of the recorder disk rotation. However, a difficulty which arises from the common clock design is a half-line phase ambiguity. That is, since there are an odd number of line clocks per disk revolution, and since field sync can occur at any point within one rotation of the disk, there can be a half-line phase ambiguity between the video and the synchronization signals supplied to a display monitor 34. To resolve the ambiguity, the phase relationship between the field and line sync supplied to a display monitor 34 is used by the control unit 18 to establish the video phase relationship by determining which track of a recorder channel is to be selected as the source of the video signal.

A read track detector 43 generates read track select signals for each recorder channel connected to a display monitor. The read track select signals, which are connected to the appropriate recorder channel via the read track selector, determine according to its logic state which track is supplying the video to the display monitor. The instant of switching from one track to the other within a channel is simultaneous with the end of the field sync of that channel. The synchronization of the track selection with the line sync provided to the display monitor is accomplished by comparing the start of the field sync pulse with the line sync pulse.

The video disk recorder system 24 has provisions for a plurality of data tracks in addition to the tracks used for storage of the video signals. Data is stored on these tracks as digital bits. For example, one of the data tracks has N equally-spaced pulses recorded thereon, where N/2 is the number of scan lines per displayed video field and provides the line synchronization to the control unit 18. Another data track generates a once per recorded disk revolution field reference pulse called the recorder marker. A still further data track, hereinafter called the sector memory, is divided into a number of sectors, with each video channel being permanently assigned one of the sectors for storage of data associated with the video frame stored in the channel. As each video frame is recorded, a field sync word and an encoding time word are placed in the sector memory. The field sync word is the number of recorder clock pulses which exist between the recorder marker pulse and the field sync pulse of a particular video frame.

The encoding time word determines the time at which the letter address code is to be inserted into an escort memory (not shown) which is contained within the LSM, said letter address code being associated with the letter corresponding to the video frame. A letter address code and a display number are developed from the keyboards 36 during the period in which the captured image is displayed. This information is placed in a display number buffer. As each video frame is assigned to a display monitor 34, the display number is written into the sector memory. When the letter address code, disposing of the letter currently being displayed, is keyed by an operator, the letter address code is transmitted to the director 28, along with its associated display number. Using the display number, the encoding time word for the letter is retrieved from the sector memory. The letter address code is sequentially entered into a transit memory, which is a digital bookkeeping track on the record medium 32, and is strobed into the escort memory in the LSM whenever the encoding time word matches the current encoding time.

Figure 3:
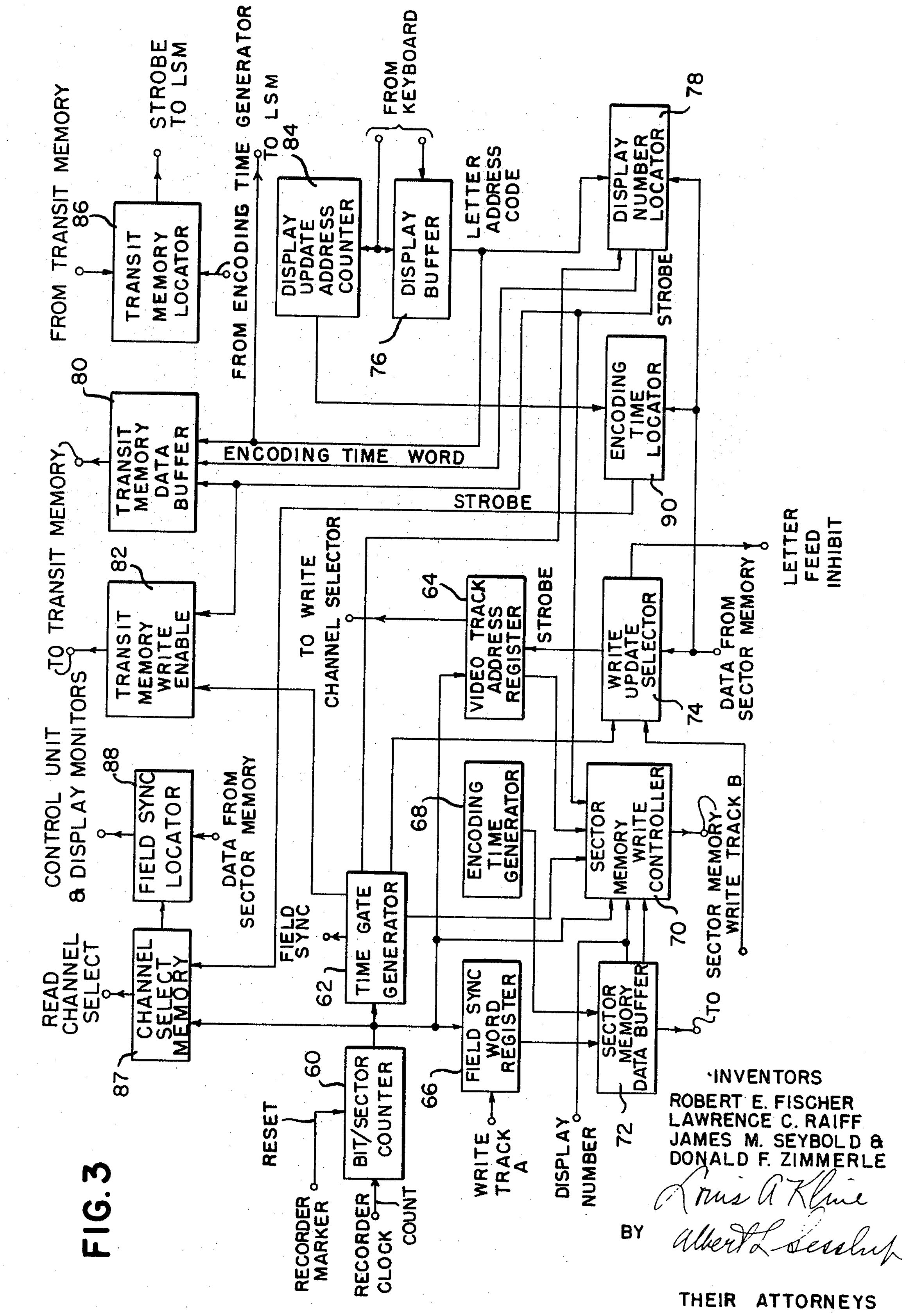
FIG. 3 is a block diagram of the director unit shown in FIG. 1.

FIG. 3 is a functional block diagram of the director 28. The director 28 controls the selection of the write channels incorporated in the recorder system 24, the assignment of the individual display monitors 34 to the recorder channels, and the temporary storage of letter address codes. The system components which make up the director 28 are conventional counting devices with associated logic circuitry. A bit sector counter 60 is reset by every recorder marker pulse and incremented by each recorder clock pulse. The state of the bit sector counter 60 identifies the angular position of the disk storage medium 32 at any given time. The counter bits are decoded by a time gate generator 62, which develops timing signals used to identify positions of the data within the sector and transit memory tracks. A video track address register 64 contains binary words identifying the channel which is to receive the next video frame from the recorder. Upon the recording of the first field, a write track A signal, supplied from the control unit 18, specifically from the recorder line counter 44, strobes the state of the bit sector counter 60 into a field sync word register 66. The field sync word and the encoding time word generated from the encoding time generator 68 are written into the sector memory during the next recorder storage disk 32 revolution. A sector memory write controller 70 generates a write enable signal for the recorder system 24 from signals provided by the video track address register 64, the time gate generator 62, and the bit sector counter 60. A sector memory data buffer 72 shifts the data into the recorder disk 32 at the appropriate time. Upon completion of the recording of a new video frame, a write track B signal, supplied from the control unit 18, enables a write update selector 74. The write update selector 74 monitors the output of the sector memory data buffer 72 until a sector containing a status bit indicating an empty video channel is detected. The current state of the bit sector counter 60 is then strobed into the video track address register 64 in preparation for a new frame recording. The write update selector 74 also counts the number of video channels available to receive a new frame and increases the letter feed, depending upon the number of available recording channels.

As previously mentioned, the director 28 generates the programming words for the read track selector 30 and the read channel selector 35. Each programming word connects a given display monitor 34 to an available recorder channel video output and connects a read track select signal to the track enable circuitry within the recorder. When an operator completes keying of the keyboard, disposing of the letter currently being displayed, the key code and the display number are strobed into a display buffer 76 by the display update signal generated by the operation of the keyboard 36. A display number locator 78 continuously examines the assigned display words located within the sector memory. Utilizing the display number contained in the display buffer 76, the sector corresponding to the video frame from which the letter address code originated may be located. An encoding time locator 90 extracts the encoding time word of the locator sector. The encoding time word and the letter address code are then written into the transit memory via a transit memory data buffer 80 and under the control of a transit memory write enable unit 82. The status bit of the sector is then changed to a video channel available state via the sector memory write controller 70.

The display update increments a display update address counter 84 by "one." The state of this counter will be equal to the encoding time word of the oldest video frame in the recorder which had not yet been assigned to a display monitor. An encoding time locator 90 continuously examines the encoding time words located within the sector memory. Thus the sector associated with the oldest unassigned video frame may be located. Upon location, the display number is written into the sector via the sector memory data buffer 72 and under control of the sector memory write controller 70. The location of the sector as obtained from the bit sector counter 60 is transferred to a channel select memory 87, which causes the read track selector 30 and the read channel selector 35 to be reprogrammed, so that a new video frame is assigned to an available display monitor.

Output of the transit memory is continuously examined by a transit memory locator 86. Upon the occurrence of a match between the encoding time and an encoding time word in the transit memory, the associated letter address code is strobed into the escort memory in the LSM, which undertakes the final disposition of the letter. A field sync locator 88 extracts the field sync words of the video channels being displayed. These field sync words are converted into field sync pulses occurring at the proper time relative to the associated video frames stored in the recorder 24. The field sync pulses are supplied to the display monitors 34 and to the control unit 18 to synchronize the monitors with respect to the rotating disk storage medium 32.

Figure 4:
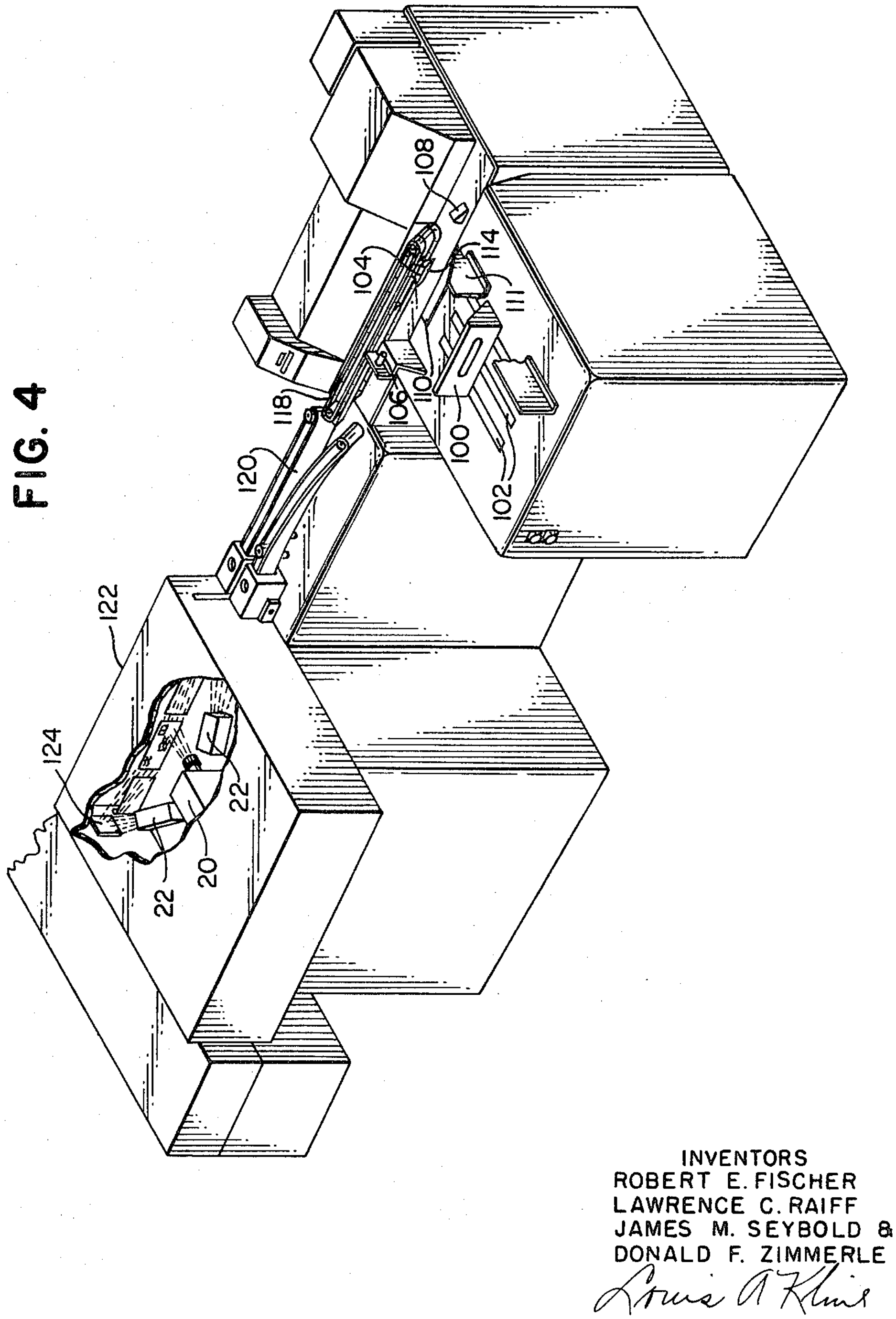
FIG. 4 is an elevational view, partly broken, of the physical apparatus constituting the present invention.

Reference is now made to FIG. 4 for a description of the mechanical embodiment of the document scanning and display system. A letter stack (not shown) is supported at an angle of forty-five degrees as determined by a wooden block 100. The wooden block 100 is motivated by feed belts 102 (three in the illustrated embodiment), which propel the letter stack in an intermittent fashion towards a pick-off unit 104. The feed belts 102 are driven by a conventional stepping motor, which is controlled by conventional electronic means so as to present the letters in such a manner that they may be picked off, one at a time, by the pick-off unit 104. A lamp 106 and a photocell 108 are utilized in sensing the end of the letter stack in order to turn the system off when the supply of letters is exhausted. It is necessary to stack the letters with the address side down and with the stamp in the upper right-hand corner, as seen when facing FIG. 4. An edging belt 110 impels the letters approaching the pick-off unit 104 in a direction opposite to the subsequent letter travel against a fence 111, so as to align the letters along their trailing, or stamp-bearing, ends. This is necessary in order to achieve synchronization and to insure constant spacing between the trailing edges of the letters. The edging belt is driven by a conventional motor (not shown). The linear movement rate of the feed belts 102 is chosen to feed letters to the pick-off unit 104 at a maximum rate of six per second at the maximum letter thickness of one quarter of an inch. It is understood, of course, that these parameters may be changed to fit the desired circumstances. A suction head 114, either in a continuous cycle, or in response to a letter feed command, is projected outwardly towards the letter stack. At this point, vacuum means connected to the suction head 114 are applied, causing the first letter to be removed from the letter stack. The linear velocity of the suction head 114 is nearly zero at this point. Upon picking up a letter, the suction head returns towards its home position while simultaneously accelerating the letter towards the left. The suction head 114, after picking up a letter, is arranged to slide in an accommodation hole which is positioned between a pair of vacuum belts 118, at which time the letter is transferred to the vacuum belts 118, whose linear velocity is very close to that of the suction head 114. The vacuum belts 118 are gear belts with the center portion of the teeth removed to accommodate a vacuum channel, and are driven at a constant speed by a conventional motor, which may also be utilized to drive the suction head 114. The present invention is capable of handling letters at synchronous or asynchronous speeds. For the latter case, the letter stream is controlled to feed a letter on command. This is accomplished by including a clutch in the drive line of the suction head 114. The clutch may be of any commercial variety on the market.

Since the vacuum belts 118 and the pick-off head 114 have similar final velocities, the chances of mis-orientation or jamming of the letters are obviated. When the letters reach the end of the vacuum belts 118, they are deposited onto twist belts 120. The letters enter on the left at about forty-five degrees with respect to the vertical. The twist belts 120 raise the letter to a vertical position while simultaneously propelling the letter towards an enclosure 122. Located within the enclosure 122 are additional vacuum belts (not shown), which take the letter from the twist belts 120 and transport the letter through the enclosure 122. The twist belt 120 and the vacuum belt 118 are driven by conventional motors. The letters are borne past the trailing edge detector 12, which initiates the image capture by the television camera 20 and the illumination of the flash lamps 22 for a period of twenty microseconds. The flash lamps 22 are shown as being directed towards mirrors 124, which in turn direct the light from the light source onto the letter surface. The mirrors may be omitted if so desired.

Although the present system has been described in terms of a plurality of displays of images simultaneously on corresponding display mirrors, the system can be easily adapted to operate for a single display unit. Such a system would require a two-channel recording medium along with the necessary bookkeeping tracks and one display monitor. One of the two channels would be used in refreshing the display monitor, and the other would be receiving newly generated video signals. This type of system would result in a greatly simplified director unit.

What is claimed is

1. A document scanning and display system for presenting images of serially moving documents on a display means and for controlling the disposition of said documents to a document utilization device comprising:

an enclosure;

an image-capturing device positioned within said enclosure;

conveying means for transporting said documents in a direction which traverses the field of view of said image-capturing device while within said enclosure;

means for initiating the operation of said image-capturing device, at a time when one of said documents is within the field of view of said device, so that an image of said document is captured by said device;

means for generating video signals in accordance with the image captured by said device;

storage means for storing said video signals;

a plurality of display monitors to receive said video signals and to display thereon the image corresponding to said documents;

each said monitor having a keyboard means associated therewith;

director control means to route the video signals for a particular document from said storage means to one of said display monitors on a first in - first out basis to enable an operator to indicate on the associated keyboard means, said disposition to be made of the displayed document by depressing a key on the keyboard means to produce a logic signal indicative of that disposition;

said director control means having circuit means to receive said logic signal and to switch the video signals for the remaining earliest recorded image from said storage means to an available one of said display monitors.

2. The system as claimed in claim 1 in which said image capturing device is an electronic camera device having a light sensitive screen, and said storage means is a rotating magnetic disc storage means having a plurality of recording channels thereon for storing the video signals of said images.

3. The system as claimed in claim 2 in which said director control means also comprises:

second circuit means for producing a second logic signal indicative of the position of the particular document among said moving documents and for producing a display signal corresponding to the particular one of said display monitors to which the video signals corresponding to the particular document will be sent; and transit memory circuit means;

said first named logic signal from said keyboard means and said display signal being used by said director control means to extract from the appropriate channel of said storage means the corresponding video signals and to make the resulting cleared channel available for the entry of video signals of another document; and said first named logic signal and its corresponding second logic signal being transferred to said transit memory means by said director control means to provide a bookkeeping track of each document scanned for use by said utilization device.

* * * * *